(12) United States Patent
Chen et al.

(10) Patent No.: US 11,954,527 B2
(45) Date of Patent: Apr. 9, 2024

(54) MACHINE LEARNING SYSTEM AND RESOURCE ALLOCATION METHOD THEREOF

(71) Applicant: INDUSTRIAL TECHNOLOGY RESEARCH INSTITUTE, Hsinchu (TW)

(72) Inventors: Shih-Chang Chen, Hsinchu (TW); Yi-Chin Chu, Taichung (TW); Yi-Fang Lu, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 537 days.

(21) Appl. No.: 17/217,846

(22) Filed: Mar. 30, 2021

(65) Prior Publication Data

US 2022/0179691 A1   Jun. 9, 2022

(30) Foreign Application Priority Data

Dec. 9, 2020  (TW) ................................. 109143419

(51) Int. Cl.
G06F 9/46      (2006.01)
G06F 9/50      (2006.01)
G06N 20/00     (2019.01)

(52) U.S. Cl.
CPC .............. G06F 9/50 (2013.01); G06N 20/00 (2019.01); *G06F 2209/501* (2013.01)

(58) Field of Classification Search
CPC ............................. G06F 9/50; G06F 2209/501
See application file for complete search history.

(56) References Cited

U.S. PATENT DOCUMENTS 7,461,376 B2  12/2008  Geye et al.
9,183,016 B2  11/2015  Zhou et al.
(Continued)

FOREIGN PATENT DOCUMENTS

CN  102831015 A  12/2012
CN  102932281 A  2/2013
(Continued)

OTHER PUBLICATIONS

Xiao, et al., "Dynamic Resource Allocation Using Virtual Machines for Cloud Computing Environment," IEEE Transactions on Parallel and Distributed Systems, vol. 24, Issue 6, pp. 1107-1117 (Jun. 2013).
(Continued)

*Primary Examiner* — Diem K Cao
(74) *Attorney, Agent, or Firm* — Maschoff Brennan

(57) ABSTRACT

A resource allocation method comprises using resources with a used resource quantity of a machine learning system to execute a first experiment which has a first minimum resource demand, receiving an experiment request associated with a target dataset, deciding a second experiment according to the target dataset, deciding a second minimum resource demand of the second experiment, allocating resources with a quantity equal to the second minimum resource demand for an execution of the second experiment when a total resource quantity of the machine learning system meets a sum of the first minimum resource demand and the second minimum resource demand and a difference between the total resource quantity and the used resource quantity meets the second minimum resource demand, determining that the machine learning system has an idle resource, and selectively allocating said the idle resource for at least one of the first experiment and the second experiment.

20 Claims, 9 Drawing Sheets

(56) References Cited

U.S. PATENT DOCUMENTS

| | | |
|---|---|---|
| 9,311,157 B2 | 4/2016 | Kim et al. |
| 9,411,659 B2 | 8/2016 | Sah |
| 10,140,161 B1 | 11/2018 | Singh et al. |
| 10,205,675 B2 | 2/2019 | Chen et al. |
| 10,268,513 B2 | 4/2019 | Jackson et al. |
| 10,467,129 B2 | 11/2019 | Conti et al. |
| 10,540,206 B2 | 1/2020 | Burdick et al. |
| 10,565,020 B2 | 2/2020 | Davila et al. |
| 11,249,810 B2 * | 2/2022 | Gabrielson ........... G06F 9/5038 |
| 2005/0108713 A1 | 5/2005 | Geye et al. |
| 2005/0108714 A1 | 5/2005 | Geye et al. |
| 2005/0108717 A1 | 5/2005 | Hong et al. |
| 2009/0187784 A1 | 7/2009 | Bernardi et al. |
| 2010/0262971 A1 | 10/2010 | Yamada et al. |
| 2012/0079498 A1 | 3/2012 | Kim et al. |
| 2014/0245298 A1 | 8/2014 | Zhou et al. |
| 2015/0052536 A1 | 2/2015 | Sah |
| 2015/0121391 A1 | 4/2015 | Wang |
| 2016/0246607 A1 | 8/2016 | Manchineni et al. |
| 2016/0358101 A1 | 12/2016 | Bowers et al. |
| 2018/0109464 A1 | 4/2018 | Chen et al. |
| 2018/0165111 A1 | 6/2018 | Feng et al. |
| 2018/0239638 A1 | 8/2018 | Inami |
| 2018/0246761 A1 | 8/2018 | Burdick et al. |
| 2018/0365019 A1 | 12/2018 | Rossi et al. |
| 2018/0373564 A1 | 12/2018 | Hushchyn |
| 2019/0034227 A1 | 1/2019 | Suman et al. |
| 2019/0114206 A1 | 4/2019 | Murugesan et al. |
| 2020/0012584 A1 | 1/2020 | Walters et al. |
| 2020/0133977 A1 | 4/2020 | Bequet et al. |
| 2020/0151012 A1 | 5/2020 | Davila et al. |
| 2020/0210867 A1 | 7/2020 | Banis et al. |
| 2021/0034428 A1 | 2/2021 | Sawazaki |
| 2021/0049275 A1 | 2/2021 | Higashiyama |

FOREIGN PATENT DOCUMENTS

| | | | |
|---|---|---|---|
| CN | 104503838 A | 4/2015 | |
| CN | 105183563 A | 12/2015 | |
| CN | 105487930 A | 4/2016 | |
| CN | 105589750 A | 5/2016 | |
| CN | 106033374 A | 10/2016 | |
| CN | 106922002 A | 7/2017 | |
| CN | 107273331 A | 10/2017 | |
| CN | 107391259 A | 11/2017 | |
| CN | 107861815 A | 3/2018 | |
| CN | 108762921 A | 11/2018 | |
| CN | 109033001 A | 12/2018 | |
| CN | 109144716 A | 1/2019 | |
| CN | 109213601 A | 1/2019 | |
| CN | 109992422 A * | 7/2019 | ........... G06F 9/4881 |
| CN | 110597639 A | 12/2019 | |
| CN | 110780991 A | 2/2020 | |
| CN | 111291894 A | 6/2020 | |
| CN | 111324454 A | 6/2020 | |
| CN | 111435315 A | 7/2020 | |
| CN | 111813523 A | 10/2020 | |
| CN | 112000473 A | 11/2020 | |
| CN | 112052087 A | 12/2020 | |
| EP | 2 495 666 A2 | 9/2012 | |
| EP | 3 340 058 A1 | 6/2018 | |
| JP | 2001-142723 A | 5/2001 | |
| JP | 2007-316710 A | 12/2007 | |
| JP | 2008-158852 A | 7/2008 | |
| JP | 2013-117806 A | 6/2013 | |
| JP | 2013-149108 A | 8/2013 | |
| JP | 2017-199044 A | 11/2017 | |
| JP | 2018-036724 A | 3/2018 | |
| KR | 2012-0031759 A | 4/2012 | |
| TW | 201415409 A | 4/2014 | |
| TW | I442323 B | 6/2014 | |
| WO | 2017/029785 A | 7/2018 | |
| WO | 2019167859 A | 9/2019 | |
| WO | 2019/198137 A1 | 7/2020 | |

OTHER PUBLICATIONS

Chen, et al., "Adaptive and Virtual Reconfigurations for Effective Dynamic Job Scheduling in Cluster Systems," IEEE Computer Society, pp. 1-8 (Feb. 5, 2021).

Barsanti, et al., "Adaptive Job Scheduling via Predictive Job Resource Allocation," vol. 4376, pp. 115-140.

Dziurzanski, et al., "Feedback-Based Admission Control for Hard Real-Time Task Allocation under Dynamic Workload on Many-core Systems," Title Suppressed Due to Excessive Length, pp. 1-13.

Cheng et al., "Deadline-Aware MapReduce Job Scheduling with Dynamic Resource Availability" IEEE Transactions on Parallel and Distributed Systems, vol. 30, No. 4, Apr. 2019.

Taiwan Office Action dated Dec. 23, 2021 as received in application No. 109143419.

* cited by examiner

MACHINE LEARNING SYSTEM AND RESOURCE ALLOCATION METHOD THEREOF

CROSS-REFERENCE TO RELATED APPLICATIONS

This non-provisional application claims priority under 35 U.S.C. § 119(a) on Patent Application No(s). 109143419 filed in Taiwan (R.O.C.) on Dec. 9, 2020, the entire contents of which are hereby incorporated by reference.

TECHNICAL FIELD

The present disclosure relates to a resource allocation method.

BACKGROUND

Machine learning algorithms automatically analyze the data to discover regularities, and use the regularities to make predictions for the unknown data. More specifically, systems applying machine learning algorithms can use training dataset to train models, and the trained models can be used to make predictions for new data. In order to make the trained models have better accuracy, it is necessary to explore hyperparameters of the models before training the models.

The hyperparameters are configurations that are external to the models. The values of the hyperparameters cannot be obtained during the training of the models, and the trials of the models should be executed repeatedly to find appropriate values of the hyperparameters. In other words, the more trials executed in a limited time, the better the chance of getting good values.

SUMMARY

According to one or more embodiment of this disclosure, a resource allocation method is applicable for a machine learning system, and comprises: using resources with a used resource quantity of the machine learning system to execute at least one first experiment, wherein each of said at least one first experiment has a first minimum resource demand; receiving an experiment request associated with a target dataset; deciding a second experiment according to the target dataset, and deciding a second minimum resource demand of the second experiment; when a total resource quantity of the machine learning system meets a sum of the first minimum resource demand and the second minimum resource demand, and a difference between the total resource quantity and the used resource quantity meets the second minimum resource demand, allocating resources with a quantity equal to the second minimum resource demand for an execution of the second experiment; and determining that the machine learning system has one or more idle resources, and selectively allocating said one or more idle resources for at least one of said at least one first experiment and the second experiment.

According to one or more embodiment of this disclosure, a machine learning system comprises an input interface, a machine learning model training executor, an experiment generator, an experiment scheduler and a dynamic resource allocator, wherein the experiment generator is connected to the input interface, the experiment scheduler is connected to the experiment generator and the machine learning model training executor, and the dynamic resource allocator is connected to the machine learning model training executor. The input interface is configured to receive an experiment request associated with a target dataset. The machine learning model training executor is configured to use resources with a used resource quantity of the machine learning system to execute at least one first experiment, wherein each of said at least one first experiment has a first minimum resource demand. The experiment generator is configured to decide a second experiment according to the target dataset and decide a second minimum resource demand of the second experiment. The experiment scheduler is configured to allocate resources with a quantity equal to the second minimum resource demand to the machine learning model training executor to execute the second experiment when a total resource quantity of the machine learning system meets a sum of the first minimum resource demand and the second minimum resource demand, and a difference between the total resource quantity and the used resource quantity meets the second minimum resource demand

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
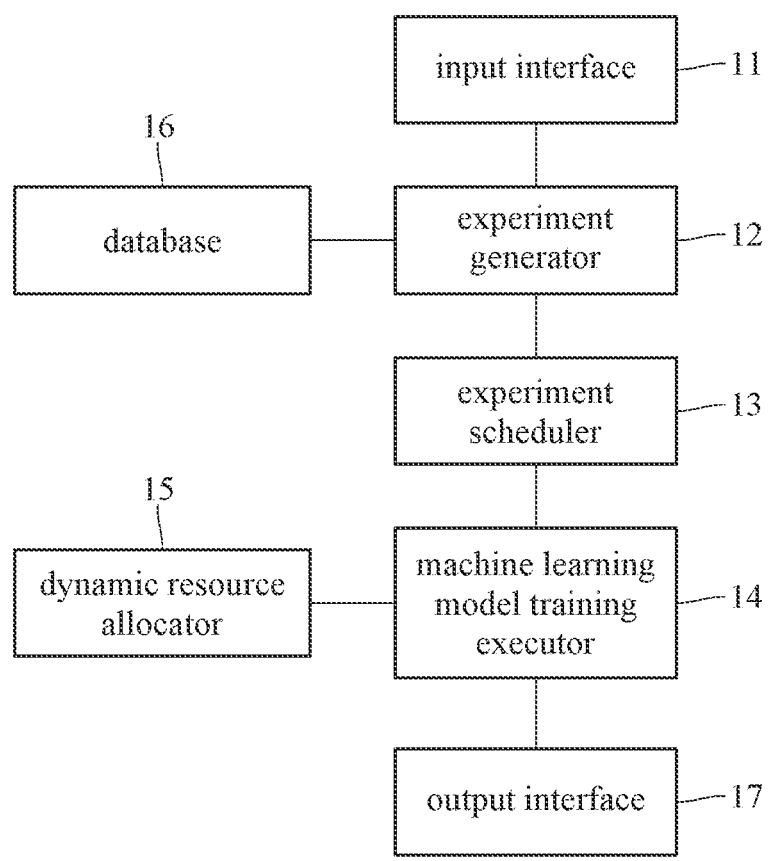
FIG. 1 is a function block diagram of a machine learning system according to an embodiment of the present disclosure.

Please refer to FIG. 1, which is a function block diagram of a machine learning system according to an embodiment of the present disclosure. As shown in FIG. 1, a machine learning system 1 can include an input interface 11, an experiment generator 12, an experiment scheduler 13, a machine learning model training executor 14, a dynamic resource allocator 15, a database 16 and an output interface 17, wherein the experiment generator 12 is connected to the input interface 11, the experiment scheduler 13 and the database 16, and the machine learning model training executor 14 is connected to the experiment scheduler 13, the dynamic resource allocator 15 and the output interface 17.

The machine learning system 1 can receives an experiment request associated with a target dataset through the input interface 11, and decide a target experiment and the minimum resource demand of the target experiment according to the target dataset by the experiment generator 12, wherein the target dataset represents the dataset to be used to train a machine learning model, and the minimum resource demand of the target experiment indicates the minimum quantity of resources required to execute the target experiment. More particularly, the database 16 may pre-store the execution efficiency data of various experiments including the target experiment, and the experiment generator 12 may decide the minimum resource demand of the target experiment according to the execution efficiency data of the target experiment. The details of the content of the dataset and the method for deciding the target experiment are described later. The machine learning system 1 can determine whether the quantity of resources of the machine learning model training executor 14 is sufficient to execute the target experiment by the experiment scheduler 13, wherein the quantity of resources is, for example, the number of central processing units (CPUs), the number of cores of a multi-core processor, etc.

The target experiment may not be the experiment first performed by the machine learning model training executor 14; that is, the step of determining whether the remaining quantity of resources is sufficient to execute the target experiment may be performed on the machine learning model training executor 14 while the machine learning model training executor 14 is currently executing other experiment(s), wherein said other experiment(s) is called "at least one first experiment" and the target experiment is called "second experiment" hereinafter. Accordingly, the experiment scheduler 13 may first determine whether the total quantity of resources that the machine learning model training executor has (hereinafter called "total resource quantity") meets the sum of the minimum resource demand of said at least one first experiment (hereinafter called "first minimum resource demand") and the minimum resource demand of the second experiment (hereinafter called "second minimum resource demand"), and then determine whether the remaining quantity of resources calculated by deducting the used resource quantity for said at least one first experiment from the total resource quantity of the machine learning model training executor 14 meets the second minimum resource demand, so as to determine whether the quantity of resources of the machine learning model training executor 14 is sufficient to execute the second experiment. The above-mentioned used resource quantity indicates the quantity of the resources currently used for the execution of said at least one first experiment, and the above-mentioned remaining quantity of resources indicates the difference between the total resource quantity and the used resource quantity.

When determining that the total resource quantity of the machine learning model training executor 14 meets the sum of the first minimum resource demand and the second minimum resource demand, and the difference between the total resource quantity and the used resource quantity meets the second minimum resource demand (i.e. determining that the quantity of resources of the machine learning model training executor 14 is sufficient to execute the second experiment), the machine learning system 1 uses the experiment scheduler 13 to allocate resources having a quantity equal to the second minimum resource demand for an execution of the second experiment, which can be regarded as training a machine learning model using the target dataset. After the second experiment is completed, the result of the second experiment such as the machine learning model of which the training is completed is output by the output interface 17. During the execution of the experiments, the machine learning system 1 may periodically (e.g. every 2, 5 or 10 minutes) determine whether the machine learning model training executor 14 has any idle resource, wherein the idle resource indicates the resource (e.g. CPU or CPU core) that is not in operation currently. When the machine learning model training executor 14 has one or more idle resources, the machine learning system 1 selectively allocates said one or more idle resources for one of said at least one first experiment and the second experiment (i.e. the experiment(s) currently being executed by the machine learning model training executor 14 or the target experiment).

The following is a further description of the hardware implementing the devices of the machine learning system 1. The input interface 11 is, for example, a keyboard, a mouse, a touch screen or other input device for a user to input one or more experiment requests. The experiment generator 12, the experiment scheduler 13 and the dynamic resource allocator 15 may be implemented by the same processor or multiple processors, wherein the so-called processor is, for example, CPU, microcontroller, programmable logic controller (PLC), etc. The machine learning model training executor 14 may include the CPU resources of the self-built computing environment or use the CPU resources of the cloud computing environment to operate, wherein the CPU resources for the machine learning model training executor 14 are independent of the CPUs or multi-core processor of the experiment generator 12, the experiment scheduler 13 and the dynamic resource allocator 15. The experiment generator 12, the experiment scheduler 13 and the dynamic resource allocator 15 form a combination for setting and monitoring the resource usage status of the machine learning model training executor 14, and the details of the setting and monitoring are described later. The database 16 may be implemented by a non-volatile memory such as a read-only memory (ROM), a flash memory, etc., and store the reference data needed for the above-mentioned setting and monitoring, wherein the reference data includes, for example, the execution efficiency data of multiple experiments, the descriptions of multiple datasets and so on, and the detailed content of the data is described later. In particular, besides connected to the experiment generator 12, the database 16 may be further connected to the experiment scheduler 13 and/or the dynamic resource allocator 15, for the three devices to obtain the necessary reference data when setting and monitoring. Or, the database 16 may be the built-in memory of the processor implementing the experiment generator 12, the experiment scheduler 13 and the dynamic resource allocator 15. The output interface 17 is, for example, a screen or other output device for outputting the execution result of the machine learning model training executor 14.

Figure 2:
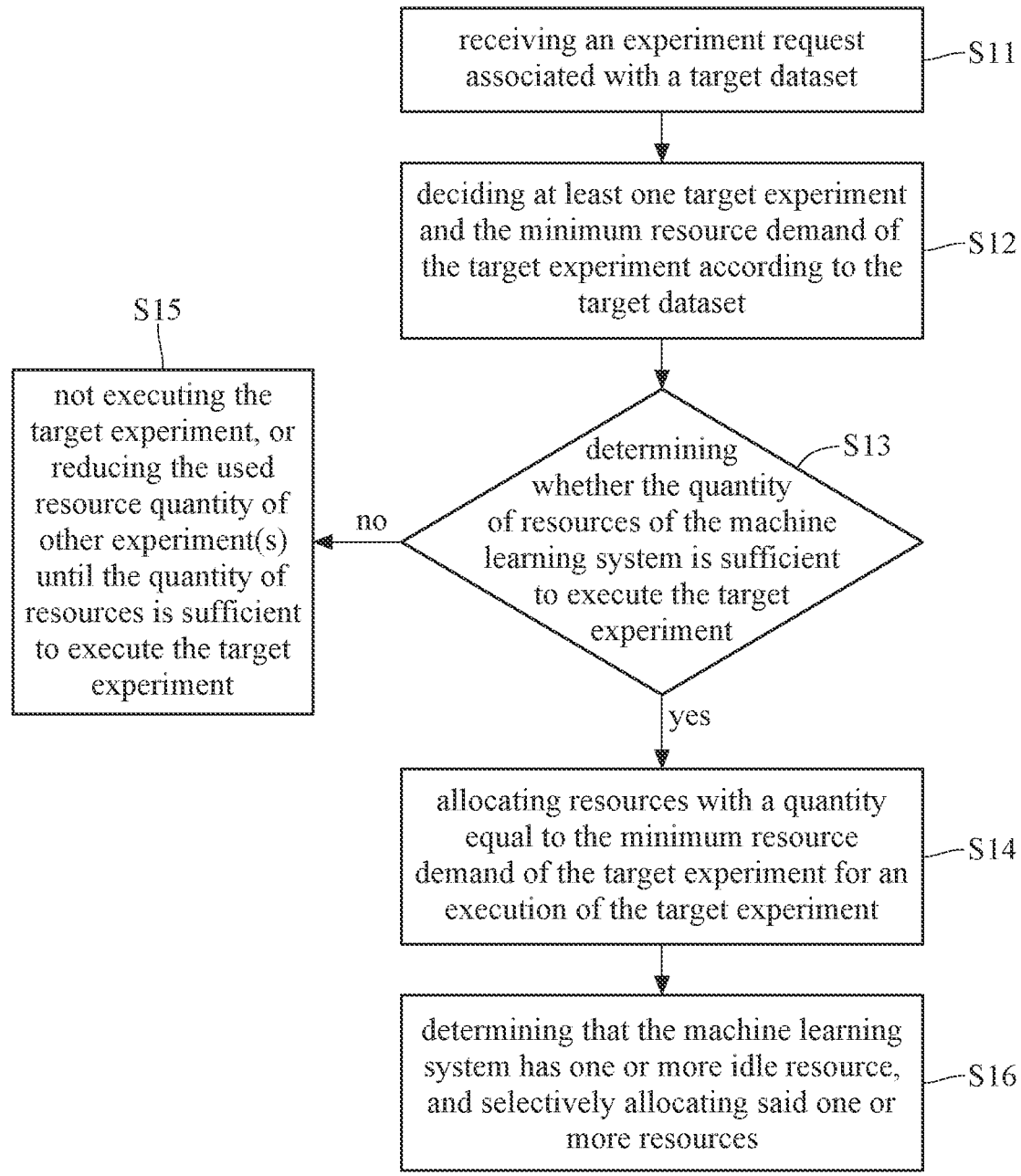
FIG. 2 is a flow chart of a resource allocation method of a machine learning system according to an embodiment of the present disclosure.

Please refer to FIG. 1 and FIG. 2, wherein FIG. 2 is a flow chart of a resource allocation method of a machine learning system according to an embodiment of the present disclosure. The resource allocation method shown in FIG. 2 is applicable for the machine learning system 1 shown in FIG. 1, but is not limited to this. As shown in FIG. 2, the resource allocation method includes step S11: receiving an experiment request associated with a target dataset; step S12:

deciding at least one target experiment and the minimum resource demand of the target experiment according to the target dataset; step S13: determining whether the quantity of resources of the machine learning system is sufficient to execute the target experiment; when the determined result is "yes", performing step S14: allocating resources with a quantity equal to the minimum resource demand of the target experiment for an execution of the target experiment; when the determined result is "no", performing step S15: not executing the target experiment, or reducing the used resource quantity of other experiment(s) until the quantity of resources is sufficient to execute the target experiment; and further include step S16: determining that the machine learning system has one or more idle resource, and selectively allocating said one or more resources. In the following, various implementations of the resource allocation method are exemplarily described using the machine learning system 1 as shown in FIG. 1.

In step S11, the input interface 11 can receive the experiment request associated with a target dataset, wherein the experiment request includes the information of the target dataset for training a machine learning model. More particularly, a user may upload files of multiple datasets to a file system which can also be called Dataset Store in advance, and the description of the target dataset may be stored in the database 16. When a user would like to train a machine learning model using the target dataset, the user may input a selection instruction of the target dataset through input interface 11. The experiment generator 12 asks the file system for the file of the target dataset according to the selection instruction, and the file system accordingly searches for the description of the target dataset in the database 16. Or, the user may directly provide the file of the target dataset to the machine learning system 1 through the target dataset. The target dataset is, for example, a CSV file, and includes a number of pieces of data. Each of the pieces of data contains multiple fields, wherein one of the fields is specified as the target field representing the field to be predicted by the machine learning model of which the training is completed, and the remaining fields serve as feature fields. The machine learning model may discover regularities between the values of the feature fields and the value of the target field, and make predictions for new data using the regularities.

In step S12, the experiment generator 12 can decide at least one target experiment and the minimum resource demand of each of said at least one target experiment according to the target dataset. More particularly, each target experiment may correspond to a specific model and include a number of target trials, wherein the target trials may respectively correspond to different combinations of hyperparameters. The execution of each of the target trials is using the target dataset to train the machine learning model based on the corresponding combination of hyperparameters. In other words, experiment generator 12 may decide the specific model corresponding to the target experiment according to the target dataset, wherein the specific model has multiple hyperparameters (e.g. model sklearn.svm.SVC has hyperparameters C: float, kernel:{'linear', ... }, degree:int, etc.), and then, the experiment generator 12 may automatically generate multiple combinations of hyperparameters with different numerical combinations and set the task of training the machine learning model using the target dataset based on each combination of hyperparameters as a target trial.

In addition to generating the trials of the target experiment, the experiment generator 12 also decides the minimum resource demand of the target experiment. More particularly, the experiment generator 12 may calculate the minimum resource demand according to the execution efficiency data of the target experiment and a target execution performance. The execution efficiency data may be pre-stored in the database 16, and include the execution time of a single trial of the target experiment corresponding to the maximum occupied resource quantity. In general, merely a single resource (e.g. a single CPU or a single CPU core) is allocated for a trial. Therefore, the execution time of a single trial of the target experiment corresponding to the maximum occupied resource quantity indicates the time required to complete a single trial by a single resource when the machine learning model training executor 14 is in the busiest state. The target execution performance indicates the target quantity of trials of the target experiment completed in a preset period (trial throughput), which may be a preset value of the experiment generator 12 or be input by a user through the input interface 11. In other words, the aforementioned experiment request may include the target execution performance. For example, if the execution efficiency data of the target experiment is 900 seconds and the target execution performance is 20 trials per hour, the experiment generator 12 may determine that at least 5 trials should be performed simultaneously by calculation; that is, the minimum resource demand is 5 resources. The present disclosure is not limited to this.

In step S13, the experiment scheduler 13 can determine whether the quantity of resources of the machine learning system 1 is sufficient to execute the target experiment. When the determined result is "yes", in step S14, the experiment scheduler 13 can allocate the resources with the quantity equal to the minimum resource demand of the target experiment to the machine learning model training executor 14 to execute the target experiment. When the determined result is "no", in step S15, the experiment scheduler 13 does not execute the target experiment or reduce the used resource quantity of other experiment(s) until the quantity of resources is sufficient to execute the target experiment.

More particularly, when the target experiment is generated by the experiment generator 12, the machine learning model training executor 14 may be currently executing other experiment(s). Accordingly, the experiment scheduler 13 may first determine whether the total resource quantity of the machine learning model training executor 14 satisfies the minimum resource demand of the target experiment and the minimum resource demand of the other experiment(s). When the determined result is "no", the experiment scheduler 13 does not execute the target experiment, and stores the target experiment into the queue which includes the experiment(s) to be executed; when the determined result is "yes", the experiment scheduler 13 further determines whether the quantity of the currently idle resources of the machine learning model training executor 14 (i.e. the difference between the total resource quantity and the currently used resource quantity of the other experiment(s)) meets the minimum resource demand of the target experiment. When the determined result is "no", which indicates that the other experiment(s) is executed using resources having a quantity higher than the minimum resource demand, the experiment scheduler 13 may reduce the used resource quantity of the other experiment(s) until the quantity of the currently idle resources of the machine learning model training executor 14 is sufficient to execute the target experiment (i.e. until the quantity of the currently idle resources is equal to the minimum resource demand of the target experiment). At this time, the experiment scheduler 13 may instruct the machine learning model training executor 14 to execute the target experiment using resources with a quantity equal to the minimum resource demand.

Step S16 is exemplarily shown after step S14, but in practice, step S16 may be performed periodically (e.g. every 2, 5 or 10 minutes) after the machine learning model training executor 14 starts to execute an experiment; that is, step S16 may be executed every specific time after the machine learning model training executor 14 starts the first experiment. Or, step S16 may be performed during any experiment executed by the machine learning model training executor 14. In step S16, the dynamic resource allocator 15 can determine whether the machine learning model training executor 14 has any idle resource. When the machine learning model training executor 14 has one or more idle resources, the dynamic resource allocator 15 selectively allocates said one or more resources for at least one of the experiments currently being executed by the machine learning model training executor 14, that is, increasing the used resource quantity of said at least one of the experiments.

Figure 3:
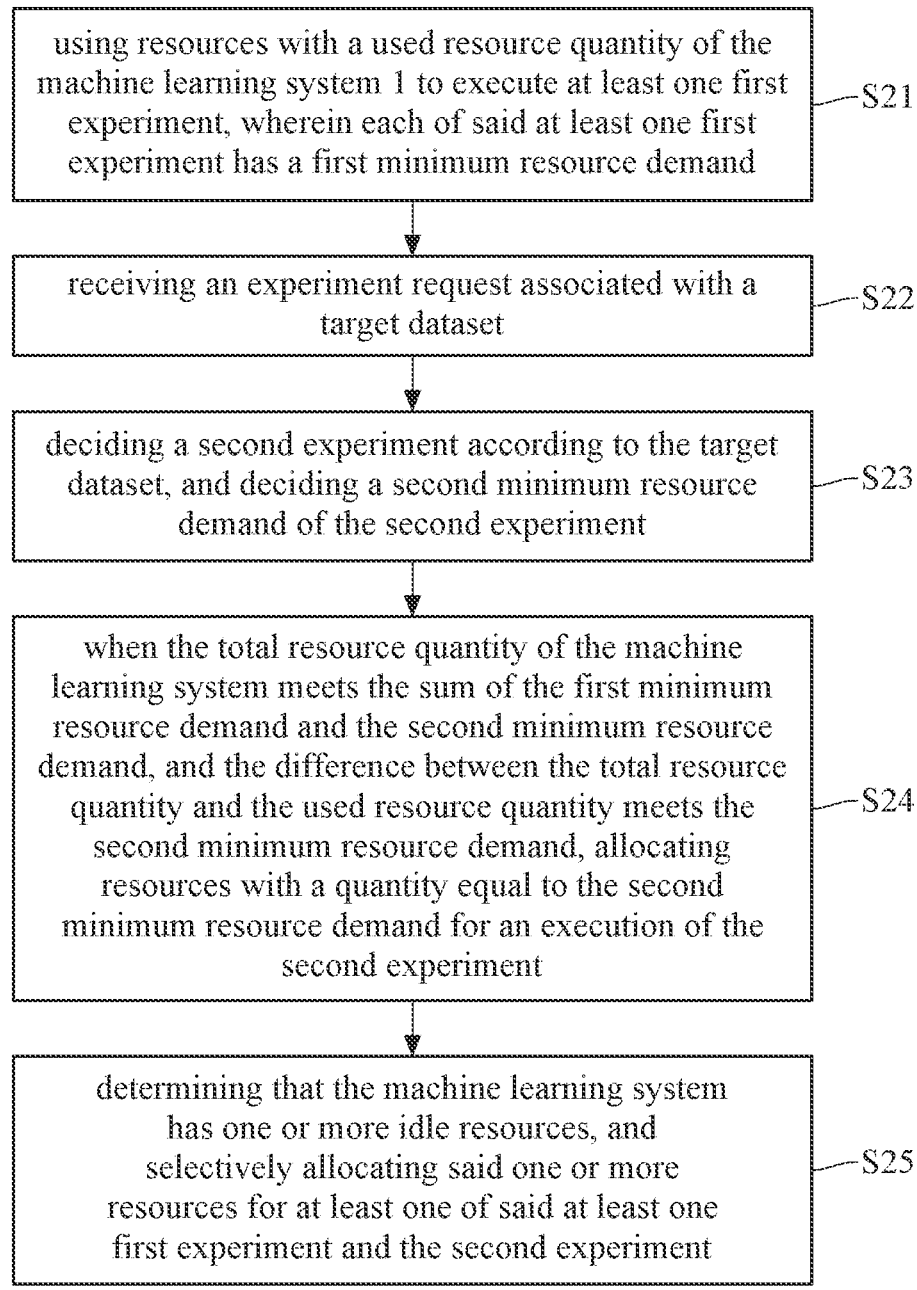
FIG. 3 is a flow chart of a resource allocation method of a machine learning system according to another embodiment of the present disclosure.

Please refer to FIG. 1 and FIG. 3, wherein FIG. 3 is a flow chart of a resource allocation method of a machine learning system according to another embodiment of the present disclosure. As mentioned above, when a new target experiment is generated, the machine learning system 1 may be currently executing other experiment(s). If the experiment(s) currently being executed by the machine learning system 1 is referred to as "at least one first experiment" and the target experiment newly generated is referred to as "second experiment", the resource allocation method of said at least one first experiment and the second experiment, as shown in FIG. 3, may include step S21: using resources with a used resource quantity of the machine learning system 1 to execute at least one first experiment, wherein each of said at least one first experiment has a first minimum resource demand; step S22: receiving an experiment request associated with a target dataset; step S23: deciding a second experiment according to the target dataset, and deciding a second minimum resource demand of the second experiment; step S24: when the total resource quantity of the machine learning system 1 meets the sum of the first minimum resource demand and the second minimum resource demand, and the difference between the total resource quantity and the used resource quantity meets the second minimum resource demand, allocating resources with a quantity equal to the second minimum resource demand for an execution of the second experiment; and step S25: determining that the machine learning system 1 has one or more idle resources, and selectively allocating said one or more resources for at least one of said at least one first experiment and the second experiment. The implementation of determining the idle resource(s) and selectively allocating the idle resource(s) in step S25 may be performed periodically (e.g. every 2, 5 or 10 minutes) after the machine learning system 1 starts to execute an experiment, or be performed during any experiment executed by the machine learning system 1.

The above-mentioned step S21 may be performed by the machine learning model training executor 14 of the machine learning system 1; step S22 may be performed by the input interface 11; step S23 may be performed by the experiment generator 12; step S24 may be performed by the machine learning model training executor 14 instructed by the experiment scheduler 13; step S25 may be performed by the dynamic resource allocator 15. In addition, when the total resource quantity of the machine learning model training executor 14 of the machine learning system 1 meets the sum of the first minimum resource demand and the second minimum resource demand, but the difference between the total resource quantity and the used resource quantity does not meet the second minimum resource demand, the experiment scheduler 13 of the machine learning system 1 may reduce the used resource quantity in order to make the difference between the total resource quantity and the used resource quantity meet the second minimum resource demand.

Figure 4A:
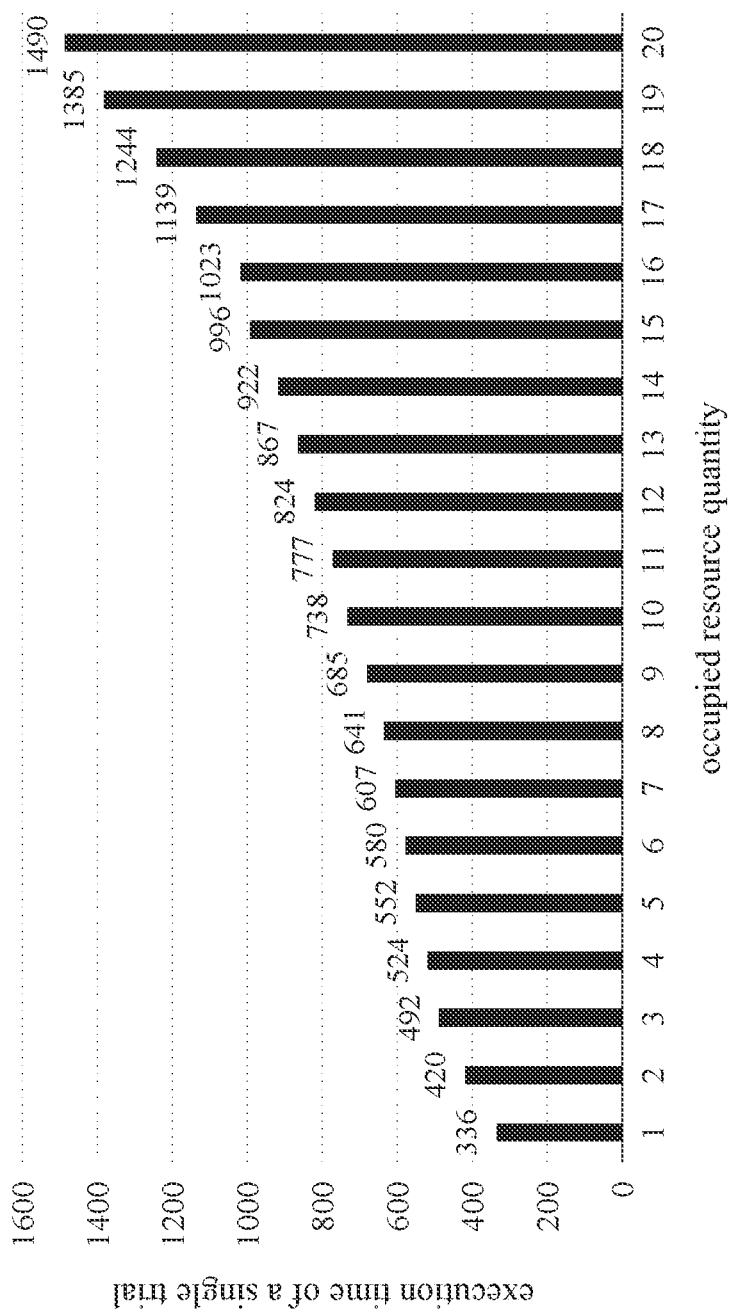
FIGS. 4A and 4B illustrate exemplary execution efficiency data of two kinds of experiments respectively.
Figure 4B:
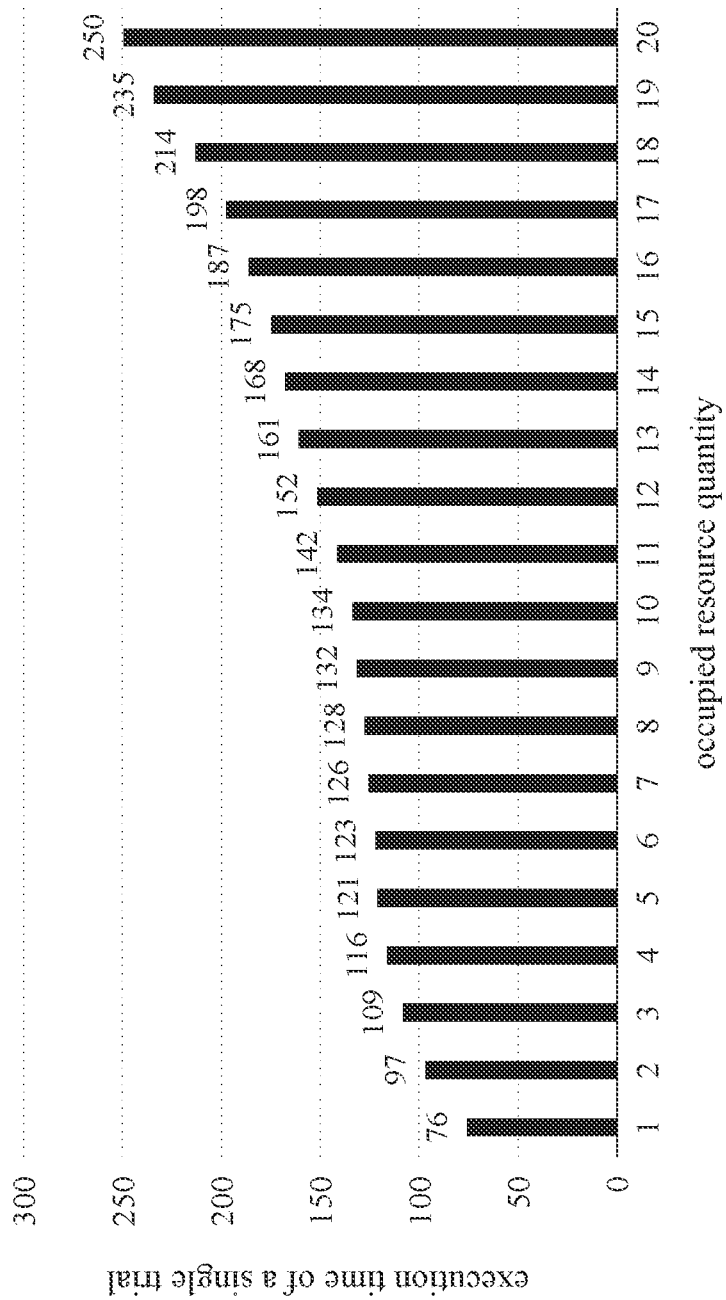

The procedure for reducing the used resource quantity of the experiment(s) (first experiment) currently being executed performed by the experiment scheduler 13 and the procedure for selectively allocating the idle resource(s) performed by the dynamic resource allocator 15 may each follow various principles some of which are based on the execution efficiency data of various experiments pre-stored in the database 16. Please refer to FIGS. 4A and 4B, which illustrate exemplary execution efficiency data of two kinds of experiments respectively. As shown in FIG. 4A, the execution efficiency data of the first kind of experiment includes the execution time of a single trial of the first kind of experiment corresponding to each of multiple occupied resource quantities. As shown in FIG. 4B, the execution efficiency data of the second kind of experiment includes the execution time of a single trial of the second kind of experiment corresponding to each of multiple occupied resource quantities. The above-mentioned occupied resource quantity indicates the quantity of CPUs that are operating in the machine learning model training executor 14, and the execution time of a single trial indicates the time required to complete a single trial by a single resource. In particular, the first kind of experiment and the second kind of experiment may be based on different models such as SVC, GBR, etc.

The occupied resource quantity shown in FIGS. 4A and 4B ranges from 1 to 20. In other words, in the embodiments corresponding to FIGS. 4A and 4B, the total resource quantity (total number of CPUs or CPU cores) of the machine learning model training executor 14 is 20. Moreover, as aforementioned, the experiment generator 12 may generate the minimum resource demand of the target experiment according to the execution time of a single trial of the target experiment corresponding to the maximum occupied resource quantity. In the examples of FIGS. 4A and 4B, the execution time of a single trial corresponding to the maximum occupied resource quantity is the execution time of a single trial corresponding to the occupied resource quantity with a value of 20. It should be noted that the values of the occupied resource quantities and the execution time of a single trial shown in FIGS. 4A and 4B are merely examples, and are not intended to limit the present disclosure.

The procedure for reducing the used resource quantity of the experiment(s) currently being executed by the experiment scheduler 13 is further described as below. When the quantity of the first experiment (i.e. the experiment currently being executed) is merely one, the experiment scheduler 13 reduces the used resource quantity of this first experiment. When the quantity of the first experiments is more than one, in an embodiment, the procedure for reducing the used resource quantity performed by the experiment scheduler 13 includes: for each of the first experiments, according to the execution efficiency data of the first experiment, determining an estimated decrease of completed trials after a hypothetical reduction in the used resource quantity corresponding to the first experiment; and reducing the used resource quantity corresponding to the first experiment which has the least estimated decrease.

The execution efficiency data of the first experiment, as described above in the embodiments of FIGS. 4A and 4B, each include the execution time of a single trial of the first experiment corresponding to each of multiple occupied resource quantities. The details of determining the estimated decrease of completed trials may be as follows. The experiment scheduler 13 takes the current used resource quantity of all the first experiments as an occupied resource quantity, and uses this occupied resource quantity to search for the execution efficiency data of each of the first experiments so as to obtain the execution time of a single trial of each of the first experiments. Then, the experiment scheduler 13 accordingly calculates the quantity of trials of each of the first experiments completed in a preset period in the state without reducing the used resource quantity of any first experiment (first operating state). For each of the first experiments, the experiment scheduler 13 takes the current used resource quantity of the first experiments minus a preset quantity as an occupied resource quantity, uses this occupied resource quantity to search for the execution efficiency data of the first experiment so as to obtain the execution time of a single trial of the first experiment, and accordingly calculates the quantity of trials of the first experiment completed in the preset period in the hypothetical state in which the preset quantity is subtracted from the used resource quantity of the first experiment (second operating state). Then, the experiment scheduler 13 subtracts the quantity of the completed trials calculated in the second operating state from that in the first operating state to obtain the estimated decrease.

For example, the first experiments include experiment A, experiment B and experiment C, which are executed using 8, 6 and 6 CPUs respectively. The experiment scheduler 13 obtains the execution time of a single trial of each of the experiment A, the experiment B and the experiment C as the occupied resource quantity is 20, and accordingly calculates the quantity of trials of the experiment A that 8 CPUs can complete in 10 minutes, the quantity of trials of the experiment B that 6 CPUs can complete in 10 minutes, and the quantity of trials of the experiment C that 6 CPUs can complete in 10 minutes, which are assumed as follows:

$A[8]=30$;
$B[6]=22$;
$C[6]=30$.

The experiment scheduler 13 also obtains the execution time of a single trial of each of the experiment A, the experiment B and the experiment C as the occupied resource quantity is 19 (the preset quantity is 1), and accordingly calculates the quantity of trials of the experiment A that 7 CPUs can complete in 10 minutes, the quantity of trials of the experiment B that 5 CPUs can complete in 10 minutes, and the quantity of trials of the experiment C that 5 CPUs can complete in 10 minutes, which are assumed as follows:

$A[7]=27$;

$B[5]=20$;

$C[5]=26$.

Based on the calculation results as listed above, the experiment scheduler 13 determines that the experiment B has the least estimated decrease (2), and therefore, reduces the used resource quantity of the experiment B by 1. The experiment scheduler 13 may repeatedly select the experiment to reduce its used resource quantity based on the above-mentioned principle until the difference between the total resource quantity and the used resource quantity of all the experiments meets the minimum resource demand of the second experiment. It should be noted that the values of the preset period and the preset quantity as mentioned above are merely examples, and the present disclosure is not limited to these. Moreover, if the used resource quantity of a specific one of the first experiments is equal to the minimum resource demand of this first experiment, this first experiment is not selected.

With the above-mentioned procedure for reducing the used resource quantity based on the execution efficiency data of each experiment, the machine learning system 1 may perform resource allocation across different tasks, take into account the relationship between the busy level of the resources and execution efficiency, and does not limit a fixed operating time (e.g. the time required to complete an experiment or the execution time of a trial). In comparison with the existing resource allocation method (e.g. first-in, first out, FIFO), the resource allocation method with the above-mentioned procedure for reducing the used resource quantity may be more flexible in resource allocation, and may adjust the resource loading immediately, so as to maintain the resources at a better execution efficiency.

In yet another embodiment, the experiment scheduler 13 may reduce the used resource quantity corresponding to one of the first experiments wherein the selection of said one of the first experiments starts with the latest-executed experiment in the first experiments, and the quantity of resources to be reduced each time may be 1 or other numbers, which is not limited in the present disclosure. Moreover, if the used resource quantity of a specific one of the first experiments is equal to the minimum resource demand of this first experiment, this first experiment is skipped.

In the following, the procedure for selectively allocating the idle resource(s) performed by the dynamic resource allocator 15 is further described. When the machine learning model training executor 14 is instructed by the experiment scheduler 13 to execute the target experiment (second experiment), which means that the experiments currently being executed by the machine learning model training executor 14 include at least one first experiment and the second experiment, the procedure for selectively allocating the idle resource(s) performed by the dynamic resource allocator 15 may include: according to the execution efficiency data of each of the first experiment(s) and the execution efficiency data of the second experiment, determining estimated execution performances of multiple allocation strategies, and allocating the idle resource(s) according to an allocation strategy which has the highest execution performance in the allocation strategies. In this embodiment, the dynamic resource allocator 15 is connected to the database 16 to obtain the execution efficiency data stored therein.

As aforementioned in the embodiments of FIGS. 4A and 4B, the execution efficiency data of the first experiment includes the execution time of a single trail of the first experiment corresponding to each of multiple occupied resource quantities, and the execution efficiency data of the second experiment includes the execution time of a single trail of the second experiment corresponding to each of multiple occupied resource quantities. The allocation strategies respectively indicate the allocation of the idle resource (s) for said at least one first experiment and the second experiment. More particularly, the allocation strategies include a first allocation strategy in which the idle resource (s) is allocated for the first experiment (if the quantity of the first experiments is more than one, first allocation strategies respectively corresponding to the first experiments are included in the allocation strategies), and include a second allocation strategy in which the idle resource(s) is allocated for the second experiment. The detailed representation of the estimated execution performance may have two implementations as described below.

In the first implementation, the estimated execution performance of the first allocation strategy indicates an estimated quantity of trials of the first experiment completed in a preset period, and the estimated execution performance of the second allocation strategy indicates an estimated quantity of trials of the second experiment completed in the preset period. More specifically, the dynamic resource allocator 15 may take the current used resource quantity of all the experiments plus a preset quantity as an occupied resource quantity, use this occupied resource quantity to search for the execution efficiency data of each of the first experiment and the second experiment so as to obtain the execution time of a single trial of each of the experiments, and accordingly calculate the quantity of trials of each of the experiments completed in the preset period in the hypothetical state in which the used resource quantity is added by the preset quantity, wherein the calculated quantity of trials completed in the preset period is regarded as the estimated execution performance.

For example, the first and second experiments include experiment D, experiment E and experiment F, which are executed using 8, 6 and 5 CPUs respectively. The dynamic resource allocator 15 obtains the execution time of a single trial of each of the experiment D, the experiment E and the experiment F as the occupied resource quantity is 20 (the preset quantity is 1), and accordingly calculates the quantity of trials of the experiment D that 9 CPUs can complete in 10 minutes, the quantity of trials of the experiment E that 7 CPUs can complete in 10 minutes and the quantity of trials of the experiment F that 6 CPUs can complete in 10 minutes, which are assumed as follows:

$D[9]=33;$ $E[7]=25;$ $F[6]=30.$

Based on the calculation results as listed above, the dynamic resource allocator 15 determines that experiment D with the largest quantity of completed trials has the highest estimated execution performance, and allocates one of the idle resource(s) (e.g. CPU) for the experiment D. The dynamic resource allocator 15 may repeatedly allocate the idle resource(s) based on the above-mentioned principle until there is no idle resource. It should be noted that the values of the preset period and the preset quantity as mentioned above are merely examples, and the present disclosure is not limited to these. Moreover, the dynamic resource allocator 15 may further determine the quantity of completed trials of all the experiments before allocating any idle resource for any experiment (original total quantity of completed trials), and when the sum of the estimated quantity of completed trials corresponding to any one of the experiments and the original quantities of completed trials respectively corresponding to the remaining experiments is not larger than the original total quantity of completed trials, the dynamic resource allocator 15 does not allocate any idle resource for any experiment.

In the second implementation, the estimated execution performance indicates an estimated execution performance of all of the experiments completed in a preset period. In addition to the operations in the example for the first implementation as aforementioned, the dynamic resource allocator 15 in the second implementation further calculates the quantity of trials of the experiment D that 8 CPUs can complete in 10 minutes, the quantity of trials of the experiment E that 6 CPUs can complete in 10 minutes and the quantity of trials of the experiment F that 5 CPUs can complete in 10 minutes according to the execution time of a single trial of each of the experiment D, the experiment E and the experiment F as the occupied resource quantity is 20. Then, the dynamic resource allocator 15 calculates the quantity of trials of all of the experiments D-F if 1 CPU is newly allocated for the experiment D, the quantity of trials of all of the experiments D-F if 1 CPU is newly allocated for the experiment E and the quantity of trials of all of the experiments D-F if 1 CPU is newly allocated for the experiment F, which are assumed as follows:

$D[9]+E[6]+F[5]=33+22+25=80;$ $D[8]+E[7]+F[5]=30+25+25=80;$ $D[8]+E[6]+F[6]=30+22+30=82.$

As shown by the above calculations, when 1 CPU is newly allocated for the experiment F, the quantity of trials of all of the experiments D-F is largest, and the dynamic resource allocator 15 accordingly determines that the experiment F has the highest estimated execution performance, and allocates one of the idle resource(s) for the experiment F. The dynamic resource allocator 15 may repeatedly allocate the idle resource(s) based on the above-mentioned principle until there is no idle resource. It should be noted that the values of the preset period and the preset quantity as mentioned above are merely examples, and the present disclosure is not limited to these. Moreover, the dynamic resource allocator 15 may further determine the quantity of completed trials of all the experiments before allocating any idle resource for any experiment (original total quantity of completed trials), and when all the estimated execution performances respectively corresponding to the experiments are not larger than the original total quantity of completed trials, the dynamic resource allocator 15 does not allocate any idle resource for any experiment. The step of determining whether the estimated execution performance corresponding to each of the experiments is larger than the original total quantity of completed trials may be performed before or after the step of determining the highest estimated execution performance, which is not limited in the present disclosure.

With the above-mentioned dynamic allocation based on the execution efficiency data of each experiment, the machine learning system 1 may perform resource allocation across different tasks, take into account the relationship between the busy level of the resources and execution efficiency, and does not limit a fixed operating time (e.g. the time required to complete an experiment or the execution time of a trial). In comparison with the existing resource allocation method (e.g. first-in, first out, FIFO), the resource allocation method with the above-mentioned dynamic allocation may be more flexible in resource allocation, and prevent inefficiency caused by resource overloads, so as to increase the quantity of trials completed in a limited time.

In yet another embodiment, the dynamic resource allocator 15 may directly allocate the idle resource(s) to the earliest-executed experiment in the experiments currently being executed (the first experiment(s) and the second experiment), and the quantity of the idle resource(s) allocated each time may be 1 or other numbers, which is not limited in the present disclosure.

Figure 5:
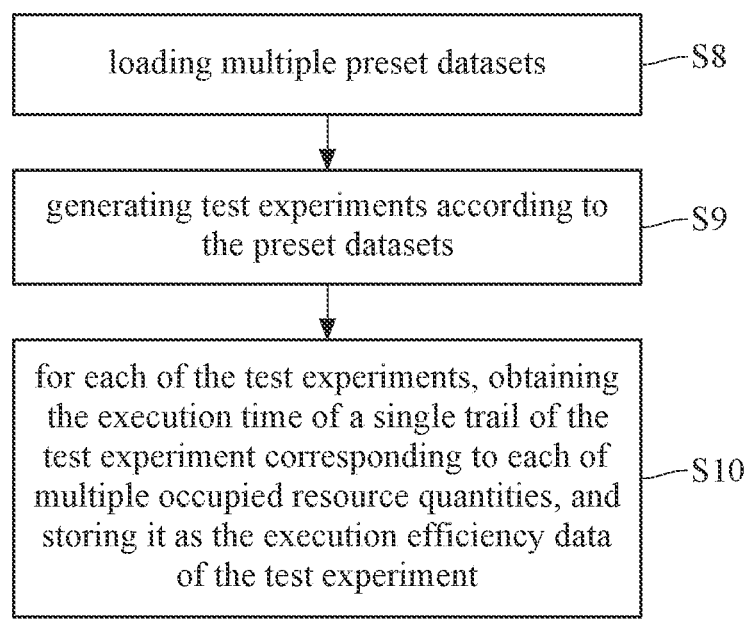
FIG. 5 is a flow chart of a procedure for initialization and collection of data according to an embodiment of the present disclosure.

In the above description, multiple implementations of the operations of the machine learning system 1 in the process of training the machine learning model are described. In addition, before the machine learning system 1 starts to receive the experiment request, the machine learning system 1 may perform a procedure for initialization and collection of data to generate the aforementioned execution efficiency data of various experiments, and store the execution efficiency data in the database 16. Please refer to FIG. 5, which is a flow chart of a procedure for initialization and collection of data according to an embodiment of the present disclosure. As shown in FIG. 5, the procedure for initialization and collection of data includes step S8: loading multiple preset datasets; step S9: generating test experiments according to the preset datasets; and step S10: for each of the test experiments, obtaining the execution time of a single trail of the test experiment corresponding to each of multiple occupied resource quantities, and storing it as the execution efficiency data of the test experiment. In the following, the procedure for initialization and collection of data is exemplarily described using the machine learning system 1 as shown in FIG. 1.

In step S8, the experiment generator 12 may load a number of datasets from the file system (Dataset Store) as the preset datasets, wherein the datasets pre-stored in the file system include the datasets uploaded by a user and/or the public datasets of the government. In step S9, the experiment generator 12 can generate a number of test experiments according to the preset datasets, wherein the first experiment and second experiment in the aforementioned embodiments are included in the test experiments. In step S10, for each of the test experiments, the machine learning model training executor 14 performs: obtaining the execution time of a single trail of the test experiment corresponding to each of multiple occupied resource quantities, and storing the obtained data in the database 16 as the execution efficiency data of the test experiment. More particularly, the machine learning model training executor 14 may execute the test experiment under multiple occupied resource quantities, record the time required to complete a single trial by a single resource under each of the occupied resource quantities, and combine the recorded time to form the execution efficiency data of the test experiment, such as the execution efficiency data shown in FIGS. 4A and 4B.

In particular, the resource allocation method as shown in FIG. 2 may further include the procedure for initialization and collection of data as shown in FIG. 5 before step S11, and the resource allocation method as shown in FIG. 3 may further include the procedure for initialization and collection of data as shown in FIG. 5 before step S21.

Figure 6:
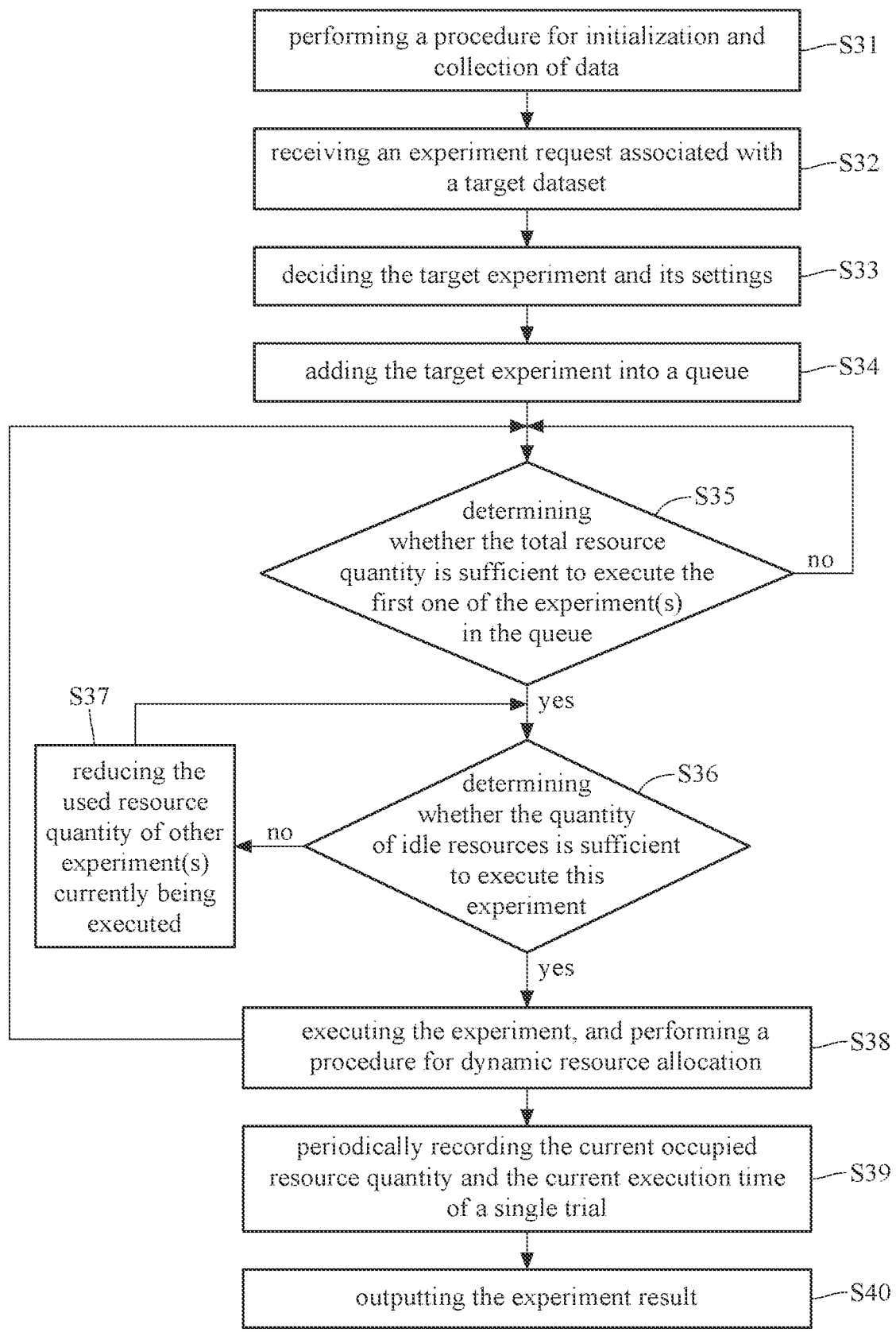
FIG. 6 is a flow chart of a resource allocation method of a machine learning system according to yet another embodiment of the present disclosure.

Please refer to FIG. 1 and FIG. 6, wherein FIG. 6 is a flow chart of a resource allocation method of a machine learning system according to yet another embodiment of the present disclosure. As shown in FIG. 6, a resource allocation method may include step S31: performing a procedure for initialization and collection of data; step S32: receiving an experiment request associated with a target dataset; step S33: deciding the target experiment and its settings; step S34: adding the target experiment into a queue; step S35: determining whether the total resource quantity is sufficient to execute the first one of the experiment(s) in the queue; when the determined result of step S35 is "no", performing step S35 again after a preset period or after another experiment is completed; when the determined result of step S35 is "yes", performing step S36: determining whether the quantity of idle resources is sufficient to execute this experiment; when the determined result of step S36 is "no", performing step S37: reducing the used resource quantity of other experiment(s) currently being executed; when the determined result of step S36 is "yes", performing step S38: executing the experiment, and performing a procedure for dynamic resource allocation; step S39: periodically recording the current occupied resource quantity and the current execution time of a single trial; step S40: outputting the experiment result. In the following, the resource allocation method as shown in FIG. 6 is exemplarily described using the machine learning system 1 as shown in FIG. 1.

In step S31, the experiment generator 12, the machine learning model training executor 14 and the database 16 may perform the procedure for initialization and collection of data together, and the details of this procedure are the same as those of steps S8-S10 in the aforementioned embodiment of FIG. 5. Steps S32 and S33 may be respectively performed by the input interface 11 and the experiment generator 12, and the details of these steps are the same as those of steps S11 and S12 in the aforementioned embodiment of FIG. 2. In step S34, the experiment generator 12 adds the target experiment into a queue, and the target experiment waits for the experiment scheduler 13 to perform the subsequent allocation on it, wherein the queue may be stored in the database 16.

In steps S35 and S36, the experiment scheduler 13 determines whether the total resource quantity of the machine learning model training executor 14 is sufficient to execute the first one of the experiment(s) in the queue, and when the determined result is "yes", further determines whether the quantity of idle resources (the result of subtracting the current used resource quantity from the total resource quantity) of the machine learning model training executor 14 is sufficient to execute the first one of the experiment(s) in the queue. The details of these two-stage judgement are the same as those of step S13 in the aforementioned of FIG. 2. When the determined result of the first stage is "no", the experiment scheduler 13 does not allocate the execution of the first one of the experiment(s) in the queue to the machine learning model training executor 14, and after a preset period or after the machine learning model training executor 14 completes a previously executed experiment, the experiment scheduler 13 performs the step of determining whether the total resource quantity is sufficient. When the determined result of the second stage is "no", as described in step S37, the experiment scheduler 13 reduces the used resource quantity of other experiment(s) currently being executed, wherein the details of this step are the same as those of step S15 in the aforementioned embodiment of FIG. 2.

In step S38, the experiment scheduler 13 allocates the execution of the first one of the experiment(s) in the queue to the machine learning model training executor 14, and the dynamic resource allocator 15 performs the procedure for dynamic resource allocation. The details of step S38 are the same as those of steps S14 and S16 in the aforementioned embodiment of FIG. 2. In step S39, during the execution of the experiment(s), the machine learning model training executor 14 may periodically record the current occupied resource quantity and the corresponding current execution time of a single trial (the time required to complete a single trial by a single resource under the occupied resource quantity). In this embodiment, the machine learning model training executor 14 is connected to the database 16 to transmit the periodically recorded data as above-mentioned to the database 16. In particular, the periodically recorded data as above-mentioned may be used to update the execution efficiency data in the database 16. Moreover, the machine learning model training executor 14 may periodically output the current execution time through the output interface 17 for an operator to confirm the execution efficiency of the computing resources of the system, wherein the output form is, for example, a display image.

In step S40, the machine learning model training executor 14 may output the execution result of the experiment, such as the machine learning model of which the training is completed. More particularly, if the target dataset belongs to a classification problem, during the training of a model using the target dataset, the machine learning model training executor 14 uses part of the data in the target dataset as training data and uses the remaining part of the data as test data. The machine learning model training executor 14 generates a training model every time a trial is completed. The machine learning model training executor 14 may use the test data to perform a classification test on each training model to generate a test score (e.g. 0.99, representing an accuracy of 99%) of each training model. The machine learning model training executor 14 then outputs the training model with the highest test score as the machine learning model of which the training is completed.

Figure 7A:
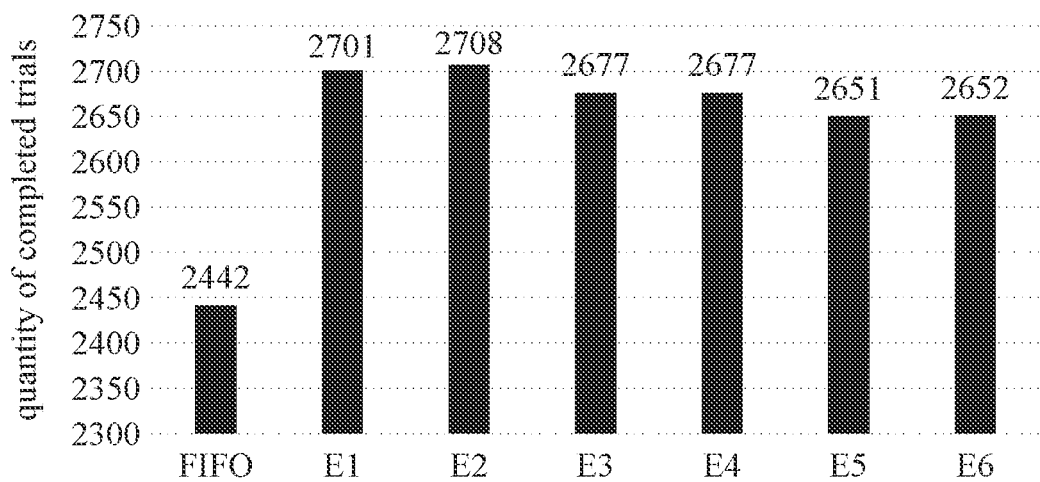
FIGS. 7A-7C show comparison charts of execution performances of the existing resource allocation method and multiple embodiments of the resource allocation method of the preset disclosure under three conditions respectively.
Figure 7B:
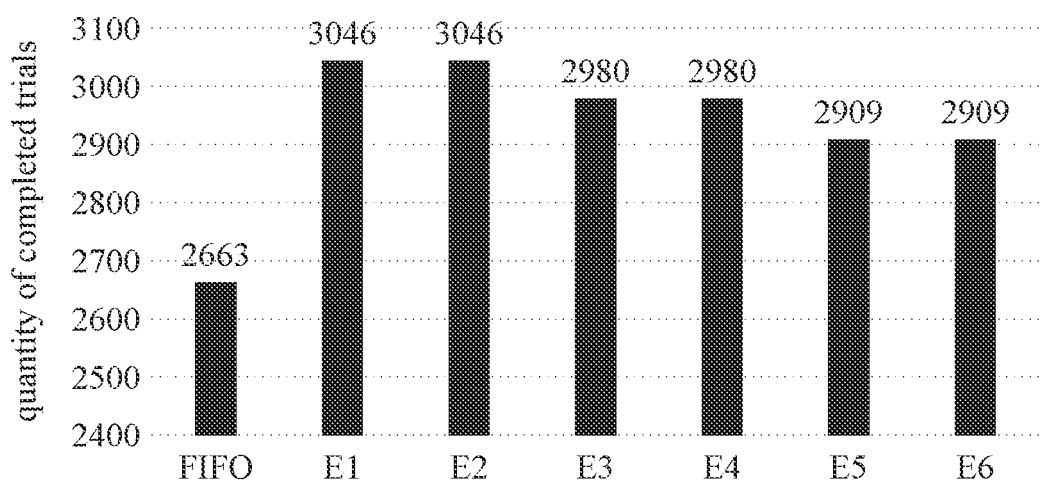
Figure 7C:
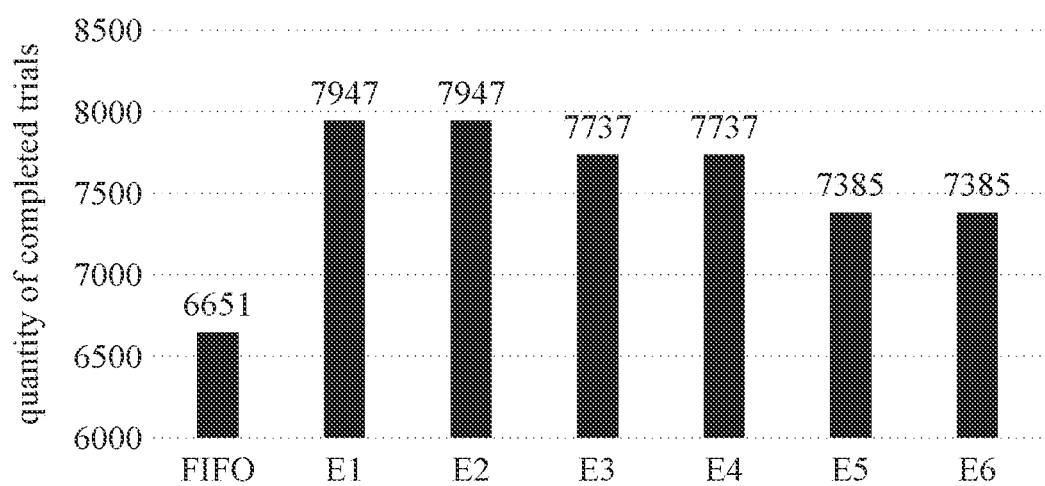

Please refer to FIGS. 7A-7C and Tables 1-3, wherein FIGS. 7A-7C show comparison charts of execution performances of the existing resource allocation method and multiple embodiments of the resource allocation method of the preset disclosure under three conditions respectively; Tables 1-3 show the number, arrival time and minimum resource demand of the experiments to be executed in said three conditions respectively.

In FIGS. 7A-7C, FIFO represents the FIFO method and E1-E6 respectively represent six embodiments (hereinafter called "the first embodiment", "the second embodiment", "the third embodiment", "the fourth embodiment", "the fifth embodiment" and "the sixth embodiment" respectively) of the present disclosure. In the first embodiment E1, the object whose used resource quantity is to be reduced is selected by: for each of the experiments, estimating the quantity of trials of the experiment completed in 2 minutes in the original operating state and the quantity of trials of the experiment completed in 2 minutes in the hypothetical state in which the used resource quantity of the experiment is reduced by 1, and selecting the experiment with the least estimated decrease; the object for which the idle resource(s) is to be allocated is selected by: for each of the experiments, estimating the quantity of trials of the experiment completed in 2 minutes in the hypothetical state in which the used quantity of the experiment is added by 1, and selecting the experiment with the largest quantity of trials completed in 2 minutes. In the second embodiment E2, the selection method of the object whose used resource quantity is to be reduced is the same as that described in the first embodiment E1, and the object for which the idle resource(s) is to be allocated is selected by: estimating the quantity of trials of all the experiments completed in 2 minutes in the hypothetical state in which the used resource quantity of each of the experiments is added by 1, and selecting the experiment corresponding to the largest quantity of trials of all the experiments completed in 2 minutes.

In the third embodiment E3, the object whose used resource quantity is to be reduced is selected by: for each of the experiments, estimating the quantity of trials of the experiment completed in 5 minutes in the original operating state and the quantity of trials of the experiment completed in 5 minutes in the hypothetical state in which the used resource quantity of the experiment is reduced by 1, and selecting the experiment with the least estimated decrease; the object for which the idle resource(s) is to be allocated is selected by: for each of the experiments, estimating the quantity of trials of the experiment completed in 5 minutes in the hypothetical state in which the used quantity of the experiment is added by 1, and selecting the experiment with the largest quantity of trials completed in 5 minutes. In the fourth embodiment E4, the selection method of the object whose used resource quantity is to be reduced is the same as that described in the third embodiment E3, and the object for which the idle resource(s) is to be allocated is selected by: estimating the quantity of trials of all the experiments completed in 5 minutes in the hypothetical state in which the used resource quantity of each of the experiments is added by 1, and selecting the experiment corresponding to the largest quantity of trials of all the experiments completed in 5 minutes.

In the fifth embodiment E5, the object whose used resource quantity is to be reduced is selected by: for each of the experiments, estimating the quantity of trials of the experiment completed in 10 minutes in the original operating state and the quantity of trials of the experiment completed in 10 minutes in the hypothetical state in which the used resource quantity of the experiment is reduced by 1, and selecting the experiment with the least estimated decrease; the object for which the idle resource(s) is to be allocated is selected by: for each of the experiments, estimating the quantity of trials of the experiment completed in 10 minutes in the hypothetical state in which the used quantity of the experiment is added by 1, and selecting the experiment with the largest quantity of trials completed in 10 minutes. In the sixth embodiment E6, the selection method of the object whose used resource quantity is to be reduced is the same as that described in the fifth embodiment E5, and the object for which the idle resource(s) is to be allocated is selected by: estimating the quantity of trials of all the experiments completed in 10 minutes in the hypothetical state in which the used resource quantity of each of the experiments is added by 1, and selecting the experiment corresponding to the largest quantity of trials of all the experiments completed in 10 minutes.

It should be noted that the detailed implementations of the reduction in the used resource quantity, the allocation of the idle resource(s) and the other steps in the resource allocation method of the first to sixth embodiments E1-E6 are as described in the aforementioned embodiments, and not repeated here.

The conditions of the experiments to be executed in FIGS. 7A-7C are respectively shown in Tables 1-3. Tables 1-3 respectively show three randomly generated combinations of experiments. In each combination, the experiments each have an experiment number, an experiment arrival time and a minimum resource demand. The format of the experiment number is "model name—the number of pieces of data (unit: thousand)". SVC indicates that the experiment produces a model by C-Support Vector Classification, which is a support vector machine classification algorithm based on support vector machine library (LIBSVM), and can train machine learning models for multiple classifications using datasets. GBR indicates that the experiment produces a model by Gradient Boosting Regressor, which is a gradient boosting machine learning technique for regression problems (the subject to be predicted is a continuous value), and can train machine learning models for regression problems using datasets. Under the conditions shown in Tables 1-3, the classification dataset used by SVC includes 50, 100 or 200 thousand pieces of data for classification problems which are randomly generated using Scikit-learn machine learning library, wherein each piece of data contains 10 classes and 10 valid information fields; the regression dataset used by GBR includes 200, 500 or 1000 thousand pieces of data for regression problems, wherein each piece of data contains 10 valid information fields.

The experiment arrival time indicates the time from when the system starts to run to when the corresponding experiment is generated by the experiment generator 12. The minimum resource demand indicates the minimum amount of resources which is required to execute the corresponding experiment and decided by the experiment generator 12. The method for deciding the minimum amount of resources is as mentioned before, and not repeated here.

TABLE 1

| Experiment number | Experiment arrival time | Minimum resource demand |
|---|---|---|
| SVC-200 | 0 minutes | 5 |
| GBR-500 | 40 minutes | 5 |
| GBR-1000 | 120 minutes | 5 |
| SVC-50 | 122 minutes | 5 |
| GBR-200 | 160 minutes | 5 |
| SVC-100 | 290 minutes | 5 |

TABLE 2

| Experiment number | Experiment arrival time | Minimum resource demand |
|---|---|---|
| GBR-200 | 0 minutes | 5 |
| SVC-200 | 10 minutes | 5 |
| SVC-200 | 20 minutes | 5 |
| SVC-100 | 30 minutes | 5 |
| GBR-200 | 40 minutes | 5 |
| GBR-500 | 50 minutes | 5 |

TABLE 3

| Experiment number | Experiment arrival time | Minimum resource demand |
|---|---|---|
| SVC-100 | 0 minutes | 5 |
| GBR-500 | 180 minutes | 5 |
| GBR-1000 | 360 minutes | 5 |
| SVC-50 | 540 minutes | 5 |
| SVC-50 | 720 minutes | 5 |
| GBR-1000 | 900 minutes | 5 |

FIGS. 7A-7C and Tables 1-3 show that the quantity of trials completed in a specific time by each of the first embodiment E1 to the sixth embodiment E6 of the resource allocation method is much more than the quantity of trials completed in the specific time by the conventional FIFO method regardless of whether the experiment arrival time is different, tight or sparse. In particular, the first embodiment E1 and the second embodiment E2 in which the preset period for estimating execution efficiency is set as 2 minutes to perform the reduction in the used resource quantity and the allocation of the idle resource(s) has better execution performance than the other embodiments.

In view of the above description, the machine learning system and the resource allocation method thereof provided in the present disclosure can automatically generate the settings of an experiment and suggest the minimum resource demand of the experiment according to the request for the experiment, execute the experiment using the resources with the quantity equal to the minimum resource demand, and then perform dynamic allocation of resources. The machine learning system and the resource allocation method thereof provided in the present disclosure may perform resource allocation among different experiments, so that the computing resources of the system may be maintained at a better execution efficiency, thereby increasing the number of the completed trials in a limited time.

What is claimed is:

1. A resource allocation method applicable for a machine learning system, and comprising:
    using resources with a used resource quantity of the machine learning system to execute at least one first experiment, wherein each of said at least one first experiment has a first minimum resource demand;
    receiving an experiment request associated with a target dataset;
    deciding a second experiment according to the target dataset, and deciding a second minimum resource demand of the second experiment;
    when a total resource quantity of the machine learning system meets a sum of the first minimum resource demand and the second minimum resource demand, and a difference between the total resource quantity and the used resource quantity meets the second minimum resource demand, allocating resources with a quantity equal to the second minimum resource demand for an execution of the second experiment; and
    determining that the machine learning system has one or more idle resources, and selectively allocating said one or more idle resources for at least one of said at least one first experiment and the second experiment,
    wherein deciding the second minimum resource demand comprises:
        according to execution efficiency data of the second experiment and a target execution performance, calculating the second minimum resource demand;
        wherein the execution efficiency data of the second experiment comprises execution time of a single trial corresponding to a maximum occupied resource quantity, and the target execution performance indicates a target quantity of trials of the second experiment completed in a preset period.

2. The resource allocation method according to claim 1, wherein selectively allocating said one or more idle resources for said at least one of said at least one first experiment and the second experiment comprising:
    according to execution efficiency data of each of said at least one first experiment and execution efficiency data of the second experiment, determining estimated execution performances of allocation strategies, wherein the allocation strategies indicate allocating said one or more idle resources for said at least one first experiment and the second experiment respectively; and
    according to an allocation strategy with a highest estimated execution performance in the allocation strategies, allocating said one or more idle resources;
    wherein the execution efficiency data of each of said at least one first experiment comprises execution time of a single trial of the first experiment corresponding to each of occupied resource quantities, and the execution efficiency data of the second experiment comprises execution time of a single trial of the second experiment corresponding to each of the occupied resource quantities.

3. The resource allocation method according to claim 2, wherein the estimated execution performance indicates an estimated quantity of trials of all experiments completed in a preset period.

4. The resource allocation method according to claim 2, wherein the allocation strategies comprise at least one first allocation strategy that indicates allocating said one or more idle resources for said at least one first experiment and a second allocation strategy that indicates allocating the said one or more idle resources for the second experiment, the estimated execution performance of each of said at least one first allocation strategy indicates an estimated quantity of trials of the first experiment completed in a preset period, and the estimated execution performance of the second allocation strategy indicates an estimated quantity of trials of the second experiment completed in the preset period.

5. The resource allocation method according to claim 1, wherein selectively allocating said one or more idle resources for at least one of said at least one first experiment and the second experiment comprises:
allocating said one or more idle resources for an earliest-executed experiment in said at least one first experiment and the second experiment.

6. The resource allocation method according to claim 1, further comprising:
when the total resource quantity meets the sum of the first minimum resource demand and the second minimum resource demand, but the difference between total resource quantity and the used resource quantity does not meet the second minimum resource demand, reducing the used resource quantity, so as to make the difference between the total resource quantity and the used resource quantity meets the second minimum resource demand.

7. The resource allocation method according to claim 6, wherein a quantity of said at least one first experiment is more than one, and reducing the used resource quantity comprises:
for each of the first experiments, according to execution efficiency data of the first experiment, determining an estimated decrease of completed trials of the first experiment after a hypothetical reduction in the used resource quantity corresponding to the first experiment, wherein the execution efficiency data of the first experiment comprises execution time of a single trial of the first experiment corresponding to each of occupied resource quantities; and
reducing the used resource quantity corresponding to an experiment with a least estimated decrease in the first experiments.

8. The resource allocation method according to claim 6, wherein a quantity of said at least one first experiment is more than one, and reducing the used resource quantity comprises:
reducing the used resource quantity corresponding to a latest-executed experiment in the first experiments.

9. The resource allocation method according to claim 1, wherein before using the resources with the used resource quantity of the machine learning system to execute said at least one first experiment, the resource allocation method further comprises:
loading preset datasets;
generating test experiments according to the preset datasets, wherein the test experiments comprise said at least one first experiment and the second experiment; and
for each of the test experiments, obtaining execution time of a single trial of the test experiment corresponding to each of occupied resource quantities, and storing the execution time as execution efficiency data of the test experiment.

10. The resource allocation method according to claim 1, further comprising:
during an execution of the second experiment, periodically recording a current occupied resource quantity and a current execution time of a single trial of the second experiment; and
outputting the current execution time.

11. A machine learning system, comprising:
an input interface configured to receive an experiment request associated with a target dataset;
a machine learning model training executor configured to use resources with a used resource quantity of the machine learning system to execute at least one first experiment, wherein each of said at least one first experiment has a first minimum resource demand;
an experiment generator connected to the input interface, and configured to decide a second experiment according to the target dataset and decide a second minimum resource demand of the second experiment;
an experiment scheduler connected to the experiment generator and the machine learning model training executor, and configured to allocate resources with a quantity equal to the second minimum resource demand to the machine learning model training executor to execute the second experiment when a total resource quantity of the machine learning system meets a sum of the first minimum resource demand and the second minimum resource demand, and a difference between the total resource quantity and the used resource quantity meets the second minimum resource demand; and
a dynamic resource allocator connected to the machine learning model training executor, and configured to determine that the machine learning model training executor has one or more idle resources, and selectively allocating said one or more idle resources for at least one of said at least one first experiment and the second experiment,
wherein deciding the second minimum resource demand performed by the experiment generator comprises:
according to execution efficiency data of the second experiment and a target execution performance, calculating the second minimum resource demand, wherein the execution efficiency data of the second experiment comprises execution time of a single trial corresponding to a maximum occupied resource quantity, and the target execution performance indicates a target quantity of trials of the second experiment completed in a preset period.

12. The machine learning system according to claim 11, wherein selectively allocating said one or more idle resources for said at least one of said at least one first experiment and the second experiment performed by the dynamic resource allocator comprises:
according to execution efficiency data of each of said at least one first experiment and execution efficiency data of the second experiment, determining estimated execution performances of allocation strategies, wherein the allocation strategies indicate allocating said one or more idle resources for said at least one first experiment and the second experiment respectively; and according to an allocation strategy with a highest estimated execution performance in the allocation strategies, allocating said one or more idle resources;

wherein the execution efficiency data of each of said at least one first experiment comprises execution time of a single trial of the first experiment corresponding to each of occupied resource quantities, and the execution efficiency data of the second experiment comprises execution time of a single trial of the second experiment corresponding to each of the occupied resource quantities.

13. The machine learning system according to claim 12, wherein the estimated execution performance indicates an estimated quantity of trials of all experiments completed in a preset period.

14. The machine learning system according to claim 12, wherein the allocation strategies comprise at least one first allocation strategy that indicates allocating said one or more idle resources for said at least one first experiment and a second allocation strategy that indicates allocating the said one or more idle resources for the second experiment, the estimated execution performance of each of said at least one first allocation strategy indicates an estimated quantity of trials of the first experiment completed in a preset period, and the estimated execution performance of the second allocation strategy indicates an estimated quantity of trials of the second experiment completed in the preset period.

15. The machine learning system according to claim 11, wherein selectively allocating said one or more idle resources for at least one of said at least one first experiment and the second experiment performed by the dynamic resource allocator comprises: allocating said one or more idle resources for an earliest-executed experiment in said at least one first experiment and the second experiment.

16. The machine learning system according to claim 11, wherein the experiment scheduler is further configured to reduce the used resource quantity when the total resource quantity meets the sum of the first minimum resource demand and the second minimum resource demand but the difference between total resource quantity and the used resource quantity does not meet the second minimum resource demand, so as to make the difference between the total resource quantity and the used resource quantity meets the second minimum resource demand.

17. The machine learning system according to claim 16, wherein a quantity of said at least one first experiment is more than one, and reducing the used resource quantity performed by the experiment scheduler comprises:

for each of the first experiments, according to execution efficiency data of the first experiment, determining an estimated decrease of completed trials of the first experiment after a hypothetical reduction in the used resource quantity corresponding to the first experiment, wherein the execution efficiency data of the first experiment comprises execution time of a single trial of the first experiment corresponding to each of occupied resource quantities; and reducing the used resource quantity corresponding to an experiment with a least estimated decrease in the first experiments.

18. The machine learning system according to claim 16, wherein a quantity of said at least one first experiment is more than one, and reducing the used resource quantity performed by the experiment scheduler comprises: reducing the used resource quantity corresponding to a latest-executed experiment in the first experiments.

19. The machine learning system according to claim 11, wherein the experiment generator is further configured to load preset datasets and generate test experiments according to the preset datasets before the machine learning model training executor executes said at least one first experiment, wherein the test experiments comprise said at least one first experiment and the second experiment, and for each of the test experiments, the machine learning model training executor is further configured to obtain execution time of a single trial of the test experiment corresponding to each of occupied resource quantities and store the execution time as execution efficiency data of the test experiment before executing said at least one first experiment.

20. The machine learning system according to claim 11, further comprising an output interface connected to the machine learning model training executor, wherein during an execution of the second experiment, the machine learning model training executor is further configured to periodically record a current occupied resource quantity and a current execution time of a single trial of the second experiment, and output the current execution time through the output interface.

* * * * *